United States Patent [19]

Hernandez

[11] Patent Number: 4,609,152
[45] Date of Patent: Sep. 2, 1986

[54] METHOD AND APPARATUS FOR APPLYING POWDERED SUBSTANCES ON FARM FIELDS, FORESTS AND SWAMP AREAS

[76] Inventor: Genaro C. Hernandez, Paseo de las Fuentes, 4412 Fracc, Villa de las Fuentes, Monterrey, Nuevo Leon, Mexico

[21] Appl. No.: 757,938

[22] Filed: Jul. 23, 1985

[51] Int. Cl.$^4$ ............ A01C 19/00; B05B 15/06; A62C 31/24; A47C 7/74

[52] U.S. Cl. ............ 239/659; 222/199; 222/231; 416/51; 416/146 R; 416/197 A; 239/200; 239/280

[58] Field of Search ............ 239/1, 8, 77, 144, 200, 239/280, 659, 660; 222/199, 231, 209, 235; 416/51, 146 R, 197 A

[56] References Cited

U.S. PATENT DOCUMENTS 3,944,139  3/1976  Butler ............ 239/652 X

FOREIGN PATENT DOCUMENTS 14309  9/1923  Australia ............ 239/200

*Primary Examiner*—Joseph F. Peters, Jr.
*Assistant Examiner*—Patrick N. Burkhart
*Attorney, Agent, or Firm*—Roylance, Abrams, Berdo & Goodman

[57] ABSTRACT

Wind-powered apparatus for applying a powdered substance over a given area including a housing designed to receive a quantity of the powdered substance, a sieve located within the housing and a wind motor assembly. The powdered substance is contained within the housing above the sieve. The wind motor assembly is rotatably received by the housing and extends through the housing. The wind motor assembly includes a center pole, a hub located on top of the center pole, a plurality of blades attached to the hub by spokes, a flexible plate which is attached to the bottom end of the pole beneath the sieve, a counterweight assembly and a scraper bar. The counterweight assembly and scraper bar are attached to the plate. As the wind acts on the blades and rotates the wind motor assembly, the scraper contacts and vibrates the sieve. This releases the powdered substance for distribution over the given area by the wind. If the wind exceeds a predetermined speed, the counterweight will rotate vertically, thus flexing and twisting the plate such that the scraper is brought out of contact with the sieve. This stops the release of the powdered substance into the wind.

14 Claims, 8 Drawing Figures

METHOD AND APPARATUS FOR APPLYING POWDERED SUBSTANCES ON FARM FIELDS, FORESTS AND SWAMP AREAS

FIELD OF THE INVENTION

This invention is related to a method and apparatus activated by the wind for applying powdered substances on farm fields, forests and swamp areas.

SUMMARY OF THE INVENTION

The apparatus according to this invention is employed by placing it above an open area, for example on crop lands. The force of the wind activates the apparatus, and the apparatus releases the powdered substance, for example powdered insecticide, which is then deposited on the crop plants by the wind. In some embodiments, the apparatus is designed to release insecticide at wind speeds of 1 Km/hour to 20 Km/hour. In these embodiments, when the wind speed is above 20 Km/hour, a mechanism activates to stop the release of the insecticide, to thus prevent the insecticide from being carried beyond the crop of place of desired application.

The advantages of the apparatus and method according to this invention include reducing the need for aerial applications of insecticides; providing a constant toxic environment for the crop; killing insects before they deposit eggs; reducing the insect population daily and reducing the cost of energy required to apply insecticide to an area since the apparatus is run by wind power.

BRIEF DESCRIPTION OF THE DRAWINGS

The apparatus of the present invention is illustrated in the accompanying drawings, wherein.

DETAILED DESCRIPTION OF THE DRAWINGS

Referring to the Figures, the illustrated apparatus according to this invention includes tower M comprised of housing assembly L mounted on a pole J. Pole J has its lower end embedded in the soil for support. Any other known methods of supporting pole J can be employed.

Housing assembly L includes housing F that is filled with a powdered substance such as powdered insecticide. The insecticide is poured into housing F through an opening (located at the top of housing F) closed by cap assembly K. Housing F is attached to pole J by band fasteners D and is cylindrically shaped.

Figure 1:
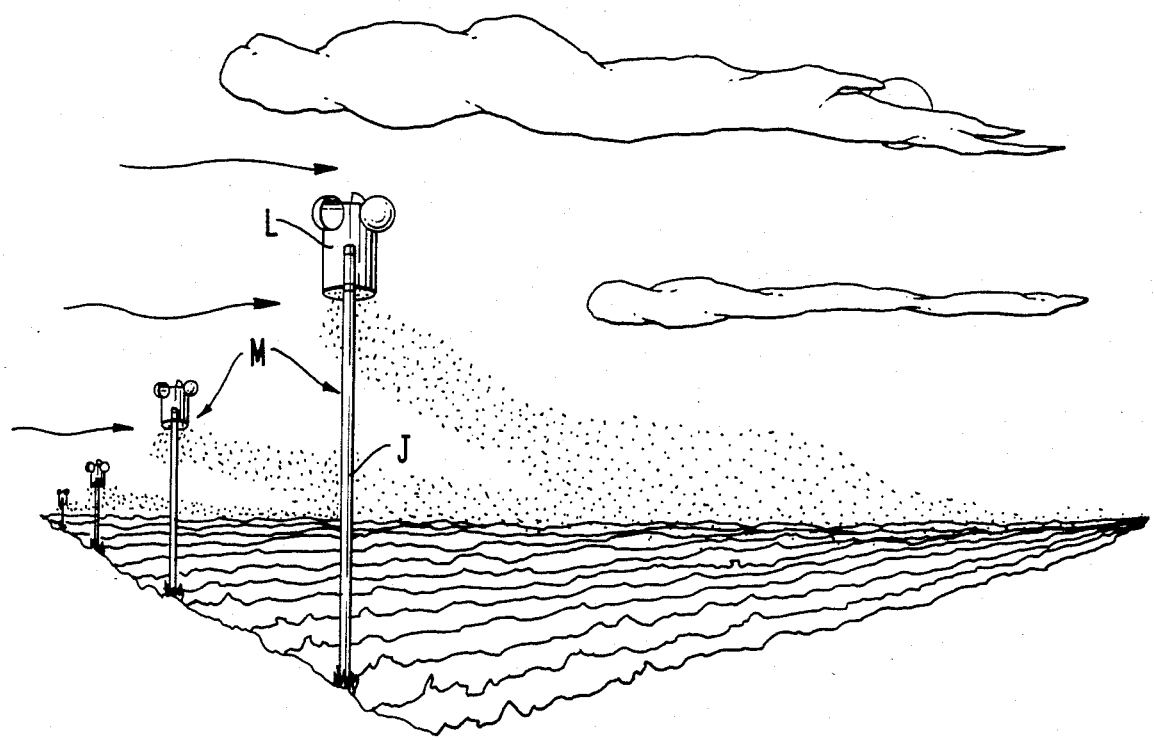
FIG. 1 is a perspective view of four of the towers of the present invention, illustrating the towers functioning on crop land.
Figure 3:
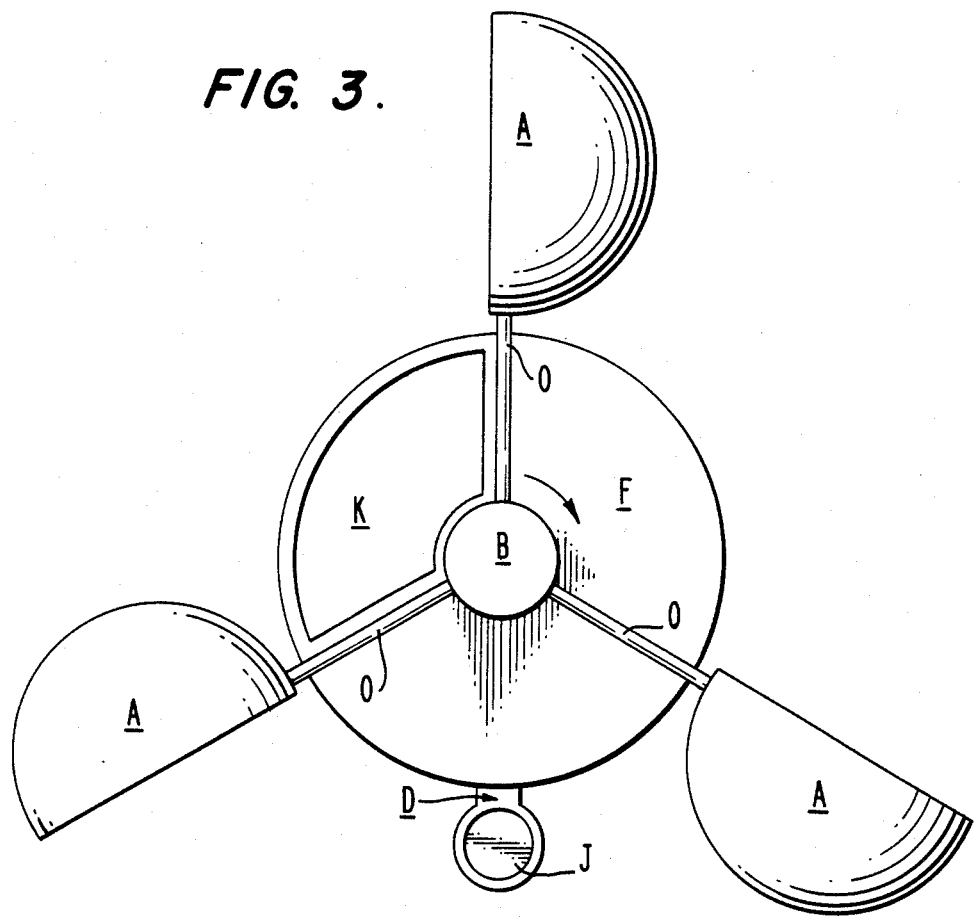
FIG. 3 is a top view of the apparatus illustrated in FIG. 2.
Figure 2:
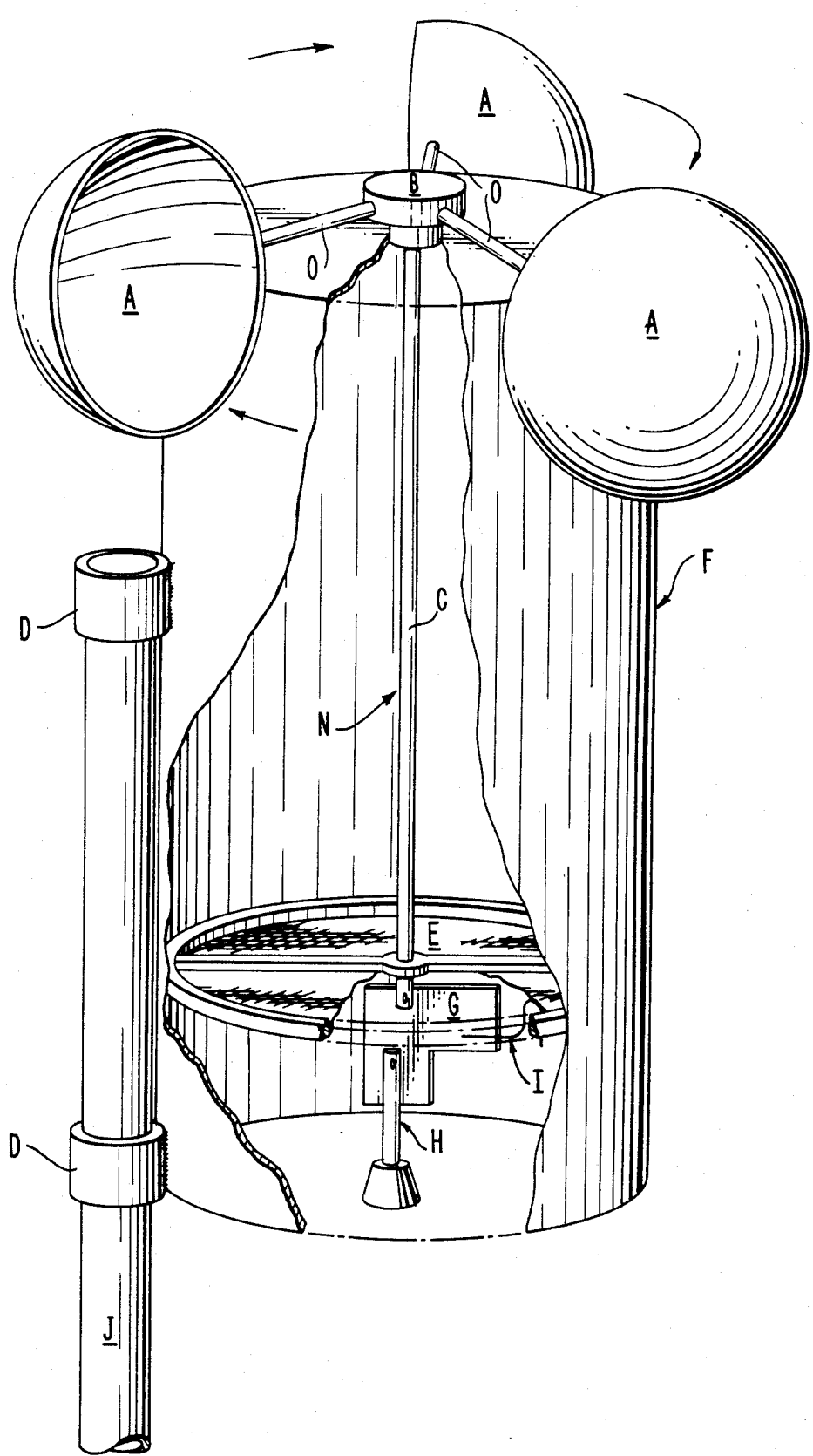
FIG. 2 is a side view, partially cut-away for clarity, of the top portion of a tower according to this invention.
Figure 4:
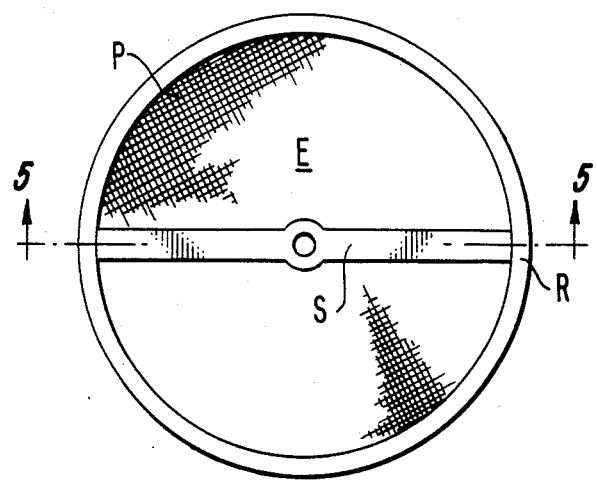
FIG. 4 is a top view of a sieve that may be included in the apparatus illustrated in FIGS. 1-3.
Figure 5:
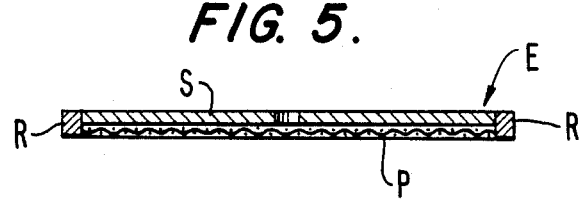
FIG. 5 is a side cross-sectional view of the sieve illustrated in FIG. 4.

Housing assembly L also includes sieve E and wind motor assembly N, which is in turn comprised of center pole C, hub B, blades A, spokes O, plate G, counterweight assembly H and scraper I. Sieve E is comprised of metal or cloth mesh P stretched onto ring band R. Sieve E may also include a cross support, such as cross support S, illustrated in FIG. 4. In some embodiments, mesh P can be directly attached to housing F, eliminating the need for ring band R and possibly cross support S.

Sieve E is fixedly attached within housing F near the lower portion thereof. Center pole C is rotatably received through the center of the top plate of housing F and sieve E. Housing F is open-ended at the bottom end.

Plate G is attached to the lower end of center pole C, below sieve E, and is in the shape of an inverted L. Scraper I is attached to the horizontal leg of the "L" and counterweight assembly H is attached to the vertical leg of the "L". Scraper I, which is a bent rod in the embodiments illustrated in the Figures, is designed to scrape the bottom of sieve E when plate G is vertically oriented. When the motor assembly N is at rest, plate G and scraper I lie in parallel vertical planes. Counterweight assembly H is rotatably attached to plate G, offset from the connection of plate G to center pole C. Plate G and counterweight assembly H act to stop the release of the powdered substance if the wind speed is too high, as discussed below.

Wind blades A are cup-shaped to receive the force of the wind. Spokes O connect blades A to hub B. Hub B is in turn fixedly attached to the top of center pole C.

The apparatus of the present invention is employed by the following method. One or more towers M are installed in a field or other area. Insecticide, or another substance in powder form, is poured into each housing F through its top opening. Sieve E has a small enough mesh size that the insecticide is retained above sieve E. The wind then acts on blades A, rotating center pole C, and thus plate G, counterweight assembly H and scraper I. As scraper I rotates, it rubs the bottom of sieve E, thus vibrating sieve E. The vibration of sieve E causes the insecticide powder to pass through sieve E and exit out the open lower end of housing F. The wind then spreads this insecticide over the desired area.

Figure 6:
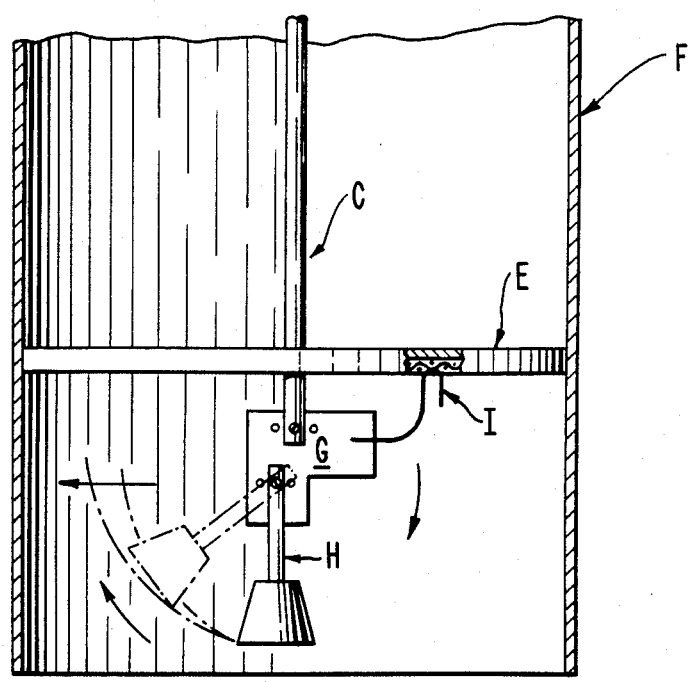
FIG. 6 is a partial cross sectional view of the lower operating parts of the apparatus illustrated in FIGS. 2 and 3.
Figure 7:
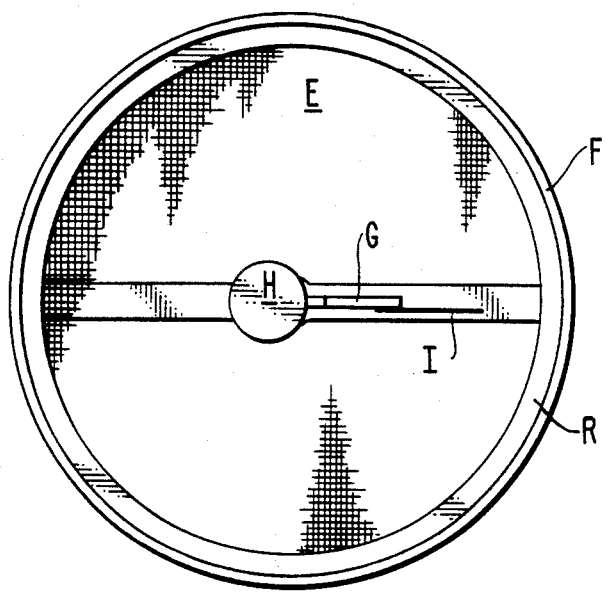
FIG. 7 is a bottom view of the housing assembly of the apparatus illustrated in FIGS. 2, 3, and 6.

However, if the wind speed is too high such that the insecticide is being carried onto areas beyond the desired application areas, then plate G and counterweight assembly H act to stop the release of insecticide. Once the wind speed is above the predetermined speed, counterweight assembly H will become vertically displaced as shown by the dotted lines in FIG. 6. This displacement of counterweight assembly H in turn flexes or twists plate G such that scraper I is brought out of contact with sieve E, thus stopping the release of insecticide.

The attachment points of plate G to center pole C and counterweight assembly H to plate G can be varied to adjust the wind speed at which plate G and counterweight H will stop the release of insecticide.

Figure 8:
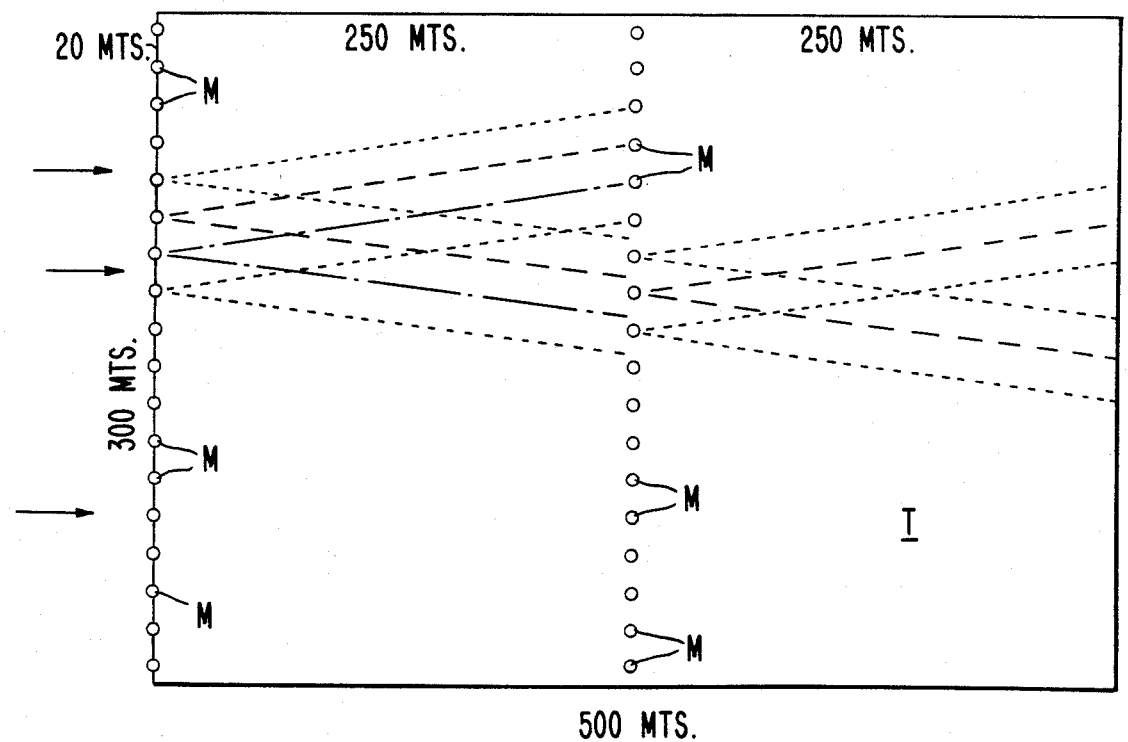
FIG. 8 is a schematic representation of a typical placement of the towers illustrated in FIGS. 2, 3, 6 and 7 in a field and of the the trajectories that the insecticide dispensed from the towers would follow over the crop land under certain wind conditions.

FIG. 8 illustrates one possible placement of towers M in a field T. Towers M are arranged in two rows spaced approximately 250 meters apart. The towers M of each row are spaced apart approximately 20 meters apart. Towers M are of a height such that housings F are positioned approximately 50 to 100 cms above the foilage or ground coverage.

Each tower M supplies a small cloud of insecticide powder such as pyrethroids and carbamates of low toxicity; this cloud increases its powdering angle as it advances in distance, until the individual clouds join and cross each other, as shown in FIG. 8.

The toxic clouds that are formed over the crop each time the wind blows exterminates the parent insects, not allowing them to deposit eggs, due to the constant toxic environment over the crops.

Other embodiments, modifications and improvements will become apparent to those skilled in the art once given this disclosure. Such other embodiments, modifications and improvements are considered to be within the scope of this invention as defined by the following claims.

What is claimed is:

1. Wind-powered apparatus for spreading a powder substance over an area, said apparatus to be fixed in a position above the area, said apparatus comprising:
   a housing for retaining a quantity of said powder substance, said housing having upper and lower ends and a side wall, said lower end of said housing being open;
   a sieve located within said housing, said sieve having a mesh size to temporarily retain said powder substance;
   a wind motor assembly rotatably attached to said housing, said motor assembly including a pole, a plurality of blades, first means for contacting and vibrating said sieve and second means for bringing said contacting means out of contact with said sieve when said motor assembly is rotating at speed greater than a predetermined speed;
   said blades, said first means and said second means being attached to said pole; said blades being designed to receive the force of the wind and rotate said wind motor assembly.

2. Apparatus according to claim 1 wherein said first means includes a bar which contacts and scrapes said sieve.

3. Apparatus according to claim 1 wherein said first and second means are located beneath said sieve.

4. Apparatus according to claim 3 wherein said first means includes a bar which contacts the underside of said sieve.

5. Apparatus according to claim 1 wherein said second means includes a counterweight assembly.

6. Apparatus according to claim 1 wherein:
   said first and second means include a first member attached to said pole, a bar which contacts said sieve and a counterweight assembly, said bar and counterweight assembly being attached to said first member; and
   said first member being capable of movement to bring the bar out of contact with said sieve upon movement of the counterweight assembly.

7. Apparatus according to claim 6 wherein the first member is a flexible plate.

8. Apparatus according to claim 7 wherein:
   said plate is in the shape of an inverted "L" and has the bar attached to one leg of the "L" and the counterweight assembly attached to the other leg of the "L".

9. Apparatus according to claim 8 wherein the attachment of the counterweight assembly to the plate is offset from the attachment of the plate of the pole.

10. Apparatus according to claim 1 wherein the pole is located in the center of the housing.

11. Apparatus according to claim 1 wherein said blades include a hollow spherical portion.

12. Apparatus according to claim 1 wherein the housing is cylindrical.

13. Apparatus according to claim 1 wherein said blades are attached to said pole near the top end of said pole and said first and second means are attached to said pole area near the bottom end of said pole.

14. Wind-powered apparatus for spreading a powder substance over an area, comprising:
    a housing having a closable top, a side wall and an open lower end;
    a sieve located within said housing; and
    a wind motor assembly including a center pole, a plurality of blades, a plate, means for contacting said sieve and a counterweight assembly;
    said center pole being rotatably received by housing, said blades being attached to said center pole, said plate being attached to said center pole;
    said counterweight assembly and said contacting means being attached to said plate;
    wherein when the wind motor assembly is rotating over a predetermined rpm, said plate and counterweight assembly bring said contacting means out of contact with the sieve.

* * * * *